US011470612B2

(12) United States Patent
Rofougaran et al.

(10) Patent No.: US 11,470,612 B2
(45) Date of Patent: Oct. 11, 2022

(54) COMMUNICATION DEVICE AND METHOD FOR LOW-LATENCY INITIAL ACCESS TO NON-STANDALONE 5G NEW RADIO NETWORK

(71) Applicant: Movandi Corporation, Irvine, CA (US)

(72) Inventors: Ahmadreza Rofougaran, Newport Beach, CA (US); Maryam Rofougaran, Rancho Palos Verdes, CA (US); Sam Gharavi, Irvine, CA (US)

(73) Assignee: MOVANDI CORPORATION, Irvine, CA (US)

( * ) Notice: Subject to any disclaimer, the term of this patent is extended or adjusted under 35 U.S.C. 154(b) by 157 days.

(21) Appl. No.: 17/038,191

(22) Filed: Sep. 30, 2020

(65) Prior Publication Data

US 2021/0014850 A1 Jan. 14, 2021

Related U.S. Application Data

(63) Continuation of application No. 16/397,713, filed on Apr. 29, 2019, now Pat. No. 10,834,724.

(51) Int. Cl.
*H04W 72/04* (2009.01)
*H04W 56/00* (2009.01)
(Continued)

(52) U.S. Cl.
CPC ........ *H04W 72/046* (2013.01); *H04B 17/318* (2015.01); *H04W 56/0015* (2013.01); *H04B 7/0695* (2013.01); *H04W 84/042* (2013.01)

(58) Field of Classification Search
CPC ........... H04W 72/046; H04W 56/0015; H04W 84/042; H04W 36/0085; H04W 48/16; H04B 17/318; H04B 7/0695; H04B 7/088; H04B 17/382; H04L 5/001; H04L 5/0023; H04L 5/0048; H04L 5/0053

See application file for complete search history.

(56) References Cited

U.S. PATENT DOCUMENTS

| 2011/0189949 A1 | 8/2011 | Fox et al. |
| 2019/0341992 A1 | 11/2019 | Zhou et al. |
| 2020/0187185 A1* | 6/2020 | Zhu ................. H04W 56/0015 |

OTHER PUBLICATIONS

Notice of Allowance for U.S. Appl. No. 16/397,713 dated Jul. 1, 2020.

* cited by examiner

*Primary Examiner* — Vinncelas Louis
(74) *Attorney, Agent, or Firm* — Chip Law Group

(57) ABSTRACT

A communication device initiates beam acquisition in a receive-only mode. Beam reception is set to an omni mode in which different beams of RF signals are receivable at the communication device from different directions. A primary signal synchronization (PSS) search is executed from each signal synchronization block location based on control information acquired directly from a first base station over a long-term evolution (LTE) control plane link or from a customer premise equipment (CPE) or user equipment (UE) that is in a radio resource control (RRC) connected state. The communication of the beam of RF signals that has highest received signal strength is activated in a new radio (NR) frequency to the UE or the CPE based on at least a PSS detected in the PSS search, for low-latency non-standalone access to the beam of RF signals in NR frequency at the UE or the CPE.

20 Claims, 7 Drawing Sheets

(51) Int. Cl.
*H04B 17/318* (2015.01)
*H04W 84/04* (2009.01)
*H04B 7/06* (2006.01)

COMMUNICATION DEVICE AND METHOD FOR LOW-LATENCY INITIAL ACCESS TO NON-STANDALONE 5G NEW RADIO NETWORK

CROSS-REFERENCE TO RELATED APPLICATIONS INCORPORATION BY REFERENCE

This patent application makes reference to, claims priority to, claims the benefit of, and is a Continuation Application of U.S. patent application Ser. No. 16/397,713, filed Apr. 29, 2019.

The above referenced application is hereby incorporated herein by reference in its entirety.

FIELD OF TECHNOLOGY

Certain embodiments of the disclosure relate to a communication device in a wireless telecommunication system. More specifically, certain embodiments of the disclosure relate to a communication device and method for low-latency initial access to non-standalone (NSA) next ($5^{th}$) generation (5G) new radio network.

BACKGROUND 5G is the next generation of wireless telecommunication technology that delivers much faster data rate as compared to long term evolution (LTE or 4G) technology. Currently, there are two solutions proposed for 5G networks, known as Non-Standalone (NSA) and standalone (SA). In the Non-Standalone (NSA), the 5G networks will be supported by existing LTE infrastructure. In the early stages of transition to 5G network, 5G cells may be partially deployed leading to incomplete or partial 5G coverage. Thus, the 5G network needs to be interworked with the existing LTE network to provide a viable solution before a complete migration occurs to a full scale or true 5G core network services. Evolved-Universal Terrestrial Radio Access (E-UTRA) New Radio (NR)-Dual Connectivity (EN-DC) is a technology that enables introduction of 5G services and data rates in a predominantly LTE network. Devices, such as customer premise equipment or user equipment, supporting EN-DC may connect simultaneously to LTE base station (i.e., eNB) and 5G-NR base station (i.e., gNB). The EN-DC supports 5G new radio (NR), which is a radio access technology that is flexible to support a much wider range of frequency bands from sub-6 GHz to millimeter wave (mmWave) bands. The EN-DC capable communication devices, also known as 5G-ready devices may enable usage of 5G services without the expense of the true 5G core network.

Initial access is the process which allows a device to first connect to a cellular network. The development of methods and systems for the initial access to NSA 5G NR network for EN-DC capable devices are still at nascent stage of research and development for practical applications. There are certain existing initial access procedures proposed for NSA 5G NR implementation, which are complicated and time consuming, for example, as a result of the use of extensive cell (base station) search and/or beam search operations in the initial access procedure.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A communication device and method for low-latency initial access to Non-Standalone (NSA) 5G NR network, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a communication device and method for low-latency initial access to NSA 5G NR network. Existing initial access procedures typically include two main steps, cell (or base station) search on the downlink and random access (RA) on the uplink. 5G NR-based systems or communication devices typically rely on directional beamforming in order to create a viable connection. The beamforming direction may be required to be learned and may be used in the IA process, which may be more complicated relative to communication systems operating at lower carrier frequencies.

Further in certain scenarios, a 5G-ready device, such as a customer premise equipment (CPE), may be situated at a distance which is beyond transmission range of a base station, and hence reception of the RF signal at the CPE may be adversely affected. Lack of refraction and diffraction in high radio frequencies also limits availability of links to line-of-sight (LOS) path or strong mirror-like reflective paths. This may be a constraint to deliver 5G NR wireless connections that are to be made available anywhere and anytime. In other scenarios one or more obstructions (such as buildings and hills) in path of the RF beam transmitted by the base station, may be blocking reception of the RF signal at the CPE. The high radio frequencies, such as the 5G NR, may demonstrate high transmittance losses when propagating through typical signal-obstructing physical objects or materials, such as tinted glass, wood, drywall, other glasses etc., when compared to sub-6 GHz radio signals. This may be a constraint for consistent availability of 5G NR connections, anywhere and anytime that may be desirable. The disclosed communication device acts as a repeater device or a relay node that that not only mitigates, for example, the aforementioned challenges, but also provides a low-latency beam search and initial access solution to NSA 5G NR network for EN-DC 5G-NR devices (e.g., 5G-ready devices). In the following description, reference is made to the accompanying drawings, which form a part hereof, and in which is shown, by way of illustration, various embodiments of the present disclosure.

Figure 1:
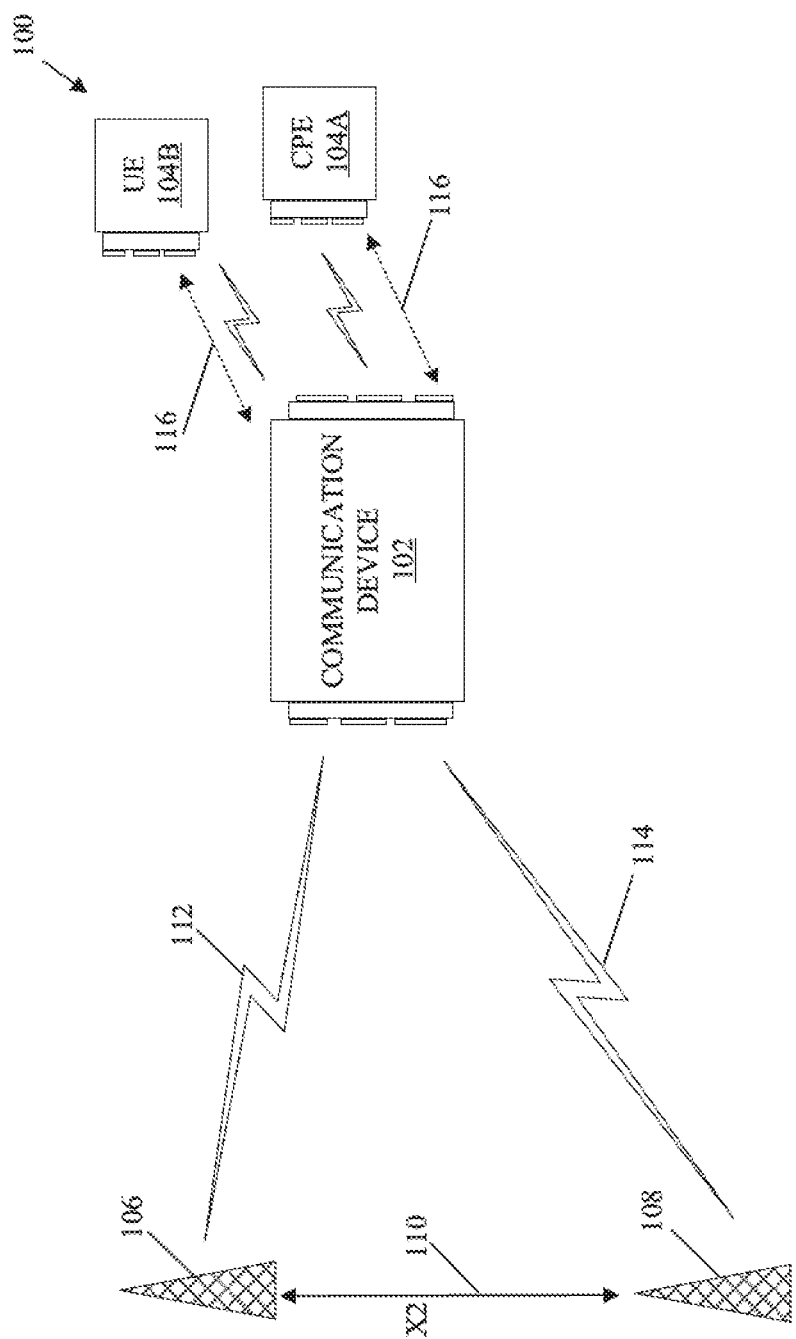
FIG. 1 is a network environment diagram that illustrates an exemplary communication device for low-latency initial access to Non-Standalone (NSA) 5G NR network, in accordance with an exemplary embodiment of the disclosure.

FIG. 1 is a network environment diagram that illustrates an exemplary communication device for low-latency initial access to NSA 5G NR network, in accordance with an exemplary embodiment of the disclosure. With reference to FIG. 1, there is shown a network environment diagram 100 that may include a communication device 102, a customer premise equipment (CPE) 104A, a user equipment (UE) 104B, a first base station 106, and a second base station 108. There is further shown a X2 interface 110 that enables communication between the first base station 106 (e.g., an eNB) and the second base station 108 (e.g., a gNB). The network environment diagram 100 depicts an exemplary EN-DC network (or NSA) architecture including the communication device 102. There is further shown a Long Term Evolution (LTE) network 112 and a 5G NR network 114.

The communication device 102 may be a NR-enabled relay node or a NR-enabled repeater device. The NR-enabled relay node or the NR-enabled repeater device may support an evolved-universal terrestrial radio access (E-UTRA)-NR dual connectivity (EN-DC) (also referred to as LTE/NR dual connectivity. In accordance with an embodiment, the communication device 102 may support multiple and a wide range of frequency spectrum, such as 3G, 4G, or 5G NR. For 5G NR, there may be two NR frequency Ranges (frequency range 1 and 2) that may be utilized for practical implementations. Frequency range 1 may overlap and extend 4G LTE frequencies, operating from 450 MHz to 6,000 MHz, which is also commonly referred to as NR or sub-6 gigahertz (GHz). Frequency range 2 operates at a much higher about 24 GHz to 52 GHz, which is commonly also referred to as millimeter wave (mmWave), although 'millimeter' frequency length typically begins at 30 GHz.

The communication device 102 may comprise suitable logic, circuitry, and interfaces that may be configured to facilitate communication between the CPE 104A (or the UE 104B) and at least the second base station 108. In certain scenarios, the communication device 102 may be positioned in a vicinity of a signal-obstructing physical object, which may partially block the path of the input RF signals from the first base station 106 or the second base station 108. The communication device 102 may be realized by various components, such as transmitter front-ends, receiver front-ends, a digital signal processor, a plurality of low-noise amplifiers, a plurality of phase shifters, a plurality of power combiners, a plurality of power dividers, and a plurality of power amplifiers, logical control units, 4G and/or 5G modems, phased lock loop (PLL) circuits, and mixers.

The first base station 106 may be an LTE eNB and the second base station 108 may be a NR-enabled base station (i.e., a gNB). In accordance with an embodiment, the first base station 106 (i.e., the eNB) may act as a master node (MeNB) and the second base station 108 (i.e., the gNB or the 5G NR-enabled base station) may operate as a secondary node. In the EN-DC, for the data plane, both the first base station 106 (MeNB) and the second base station 108 (i.e., gNB) may have a direct interface with LTE core network (e.g. serving gateway (S-GW), not shown). However, for the control plane, only the first base station 106 (MeNB) may have a direct interface with LTE core network (such as mobility management entity (MME). Multiple base stations corresponding to one service provider, may be geographically positioned to cover specific geographical areas. Typically, bandwidth requirements serve as a guideline for a location of a base station based on relative distance between the one or more remote CPEs, such as the CPE 104A (or the UE 104B) and the first base station 106 or the second base station 108. The count of base stations may be dependent on, for example, population density and geographic irregularities, such as buildings and mountain ranges, which may interfere with beams of RF signals. The communication device 102 may be deployed between a base station (e.g. the first base station 106 and the second base station 108) and the one or more remote CPEs, such as the CPE 104A to mitigate lack of LOS between at least one base station, such as the first base station 106 or the second base station 108, and the one or more remote CPEs, such as the CPE 104A.

The CPE 104A may be an EN-DC capable telecommunication hardware located at the customer's premises (certain physical location of user) rather than on the service provider's premises, or in between. In other words, the CPE 104A may be equipped with dual radios with both receiver (RX) and transmitter (TX), thus allowing it to be fully connected to both the first base station 106 (e.g., MeNB) and the second base station 108 (e.g., the gNB). The CPE 104A may be configured to establish a short-range communication link with the communication device 102. Examples of the CPE 104A may include, but are not limited to a wireless modem, a home router, a cable or satellite television set-top box, a VoIP base station, or any other customized hardware for telecommunication.

The UE 104B refers to a telecommunication hardware used by an end-user to communicate. Alternatively stated, the UE 104B may refer a combination of mobile equipment and subscriber identity module (SIM). Examples of the UE 104B may include, but are not limited to a smartphone, a mobile communication equipment, or any other customized hardware for telecommunication.

In accordance with an embodiment, the X2 interface 110 may be an over the air communication interface between the first base station 106 (master node or LTE MeNB) and the second base station 108 (e.g., Secondary Node or 5G NR gNB) for EN-DC interworking. The X2 interface 110 may include control plane or signaling plane (X2-C) and user plane or data plane (X2-U). In accordance with an embodiment, the control plane may handle communication of system information and control of the CPE 104A (or the UE 104B) connectivity, and the user plane may handle CPE/UE specific data. For the data plane, both the first base station 106 (master node or LTE MeNB) and the second base station 108 (e.g., Secondary Node or 5G NR gNB) may have a direct interface with LTE core network (i.e., serving gateway (S-GW)). However, for the control plane, only the first base station 106 (e.g., MeNB) may have a direct interface with the LTE core network (e.g., mobility management entity (MME)). In some embodiments, the X2-interface may be optional or may be replaced by some other suitable communication interface.

In the LTE network 112, the first base station 106 (e.g., the MeNB) may be responsible for maintenance of the RRC connections and control plane functions. In the NSA, the radio connection is anchored in LTE network 112 while 5G NR carriers of the 5G NR network 114 may be used to boost data-rates. The communication device 102 provides low-latency initial access to 5G NR network 114 in NSA mode.

The short-range wireless communication link 116 may be a wireless channel between the CPE 104A (or the UE 104B) and the communication device 102. The short-range wireless communication link 116 may be established by a short-range wireless communication protocol or network. Examples of the short-range wireless communication network may include, but are not be limited to, a Wireless-Fidelity (Wi-Fi) based network, a Light-Fidelity (Li-Fi) based network, a wireless personal area network (WPAN) such as a Bluetooth network, Internet-of-Things (IoT) network, Machine-Type-Communication (MTC) network, and/or a Wi-Max based network.

In operation, the communication device 102 may be configured to receive initiate beam acquisition in a receive-only mode. The receive-only mode may also be referred to as downlink-only mode, in which a further communication (or relay) of input RF signals received at the communication device 102 from the base stations (such as the first base station 106 or the second base station 108) is deactivated. Alternatively stated, the received input RF signals are not further transmitted to the CPE 104A (or the UE 104B). The communication device 102 may be configured to acquire control information from the CPE 104A (or the UE 104B). The CPE 104A (or the UE 104B) may be in a specified proximal range of the communication device 102. The CPE 104A (or the UE 104B) may be in a radio resource control (RRC) connected state over the LTE network 112. Alternatively, the communication device 102 may be configured to acquire the control information directly from the first base station 106 over a LTE control plane link. Typically, the control plane handles communication of system information and control of the CPE 104A (or the UE 104B) connectivity. It is known that the control plane deals with signaling and control function, while a user plane deals with actual user data transmission. Examples of such signaling and control functions in the LTE control plane may include security control, authentication, setting up of bearers, mobility management, Radio Resource Control (RRC), EUTRAN signaling, and Non-Access-Stratum (NAS) signaling known in the art.

In accordance with an embodiment, the communication device 102 may be configured to first establish a short-range wireless communication link 116 with the CPE 104A (or the UE 104B) that is in the specified proximal range of the communication device 102. The control information may then be acquired from the CPE 104A (or the UE 104B) over the established short-range wireless communication link 116. The control information may include information of one or more signal synchronization blocks (SSBs). The control information indicates a set of potential carrier frequencies shared via the LTE network 112 to the CPE 104A (or the UE 104B).

In accordance with an embodiment, the communication device 102 may be further configured to set beam reception at the communication device 102 to an omnidirectional (omni) mode in which a plurality of different beams of RF signals are receivable at the communication device 102 from a plurality of different directions (omnidirectional beams). Thus, there is no beamforming operations yet at the communication device 102. Setting the beam reception to the omni mode accelerates initial primary signal synchronization (PSS) search.

The communication device 102 may include a phase-locked loop (PLL) circuit (not shown in FIG. 1), which may be tuned to radio bursts of an SSB for each carrier frequency of a plurality of carrier frequencies based on the received control information. The plurality of carrier frequencies may correspond to a plurality of SSB frequencies indicated by the control information.

In accordance with an embodiment, the communication device 102 may be further configured to execute a primary signal synchronization (PSS) search from each SSB location of a plurality of SSB locations based on the acquired control information. The communication device 102 may be further configured to detect the PSS for at least one SSB location based on the executed PSS search. The communication device 102 may be further configured to align a timing offset of the beam reception to a frame structure of a 5G NR radio frame based on the detected PSS for the at least one SSB location. The detected PSS indicates a timing boundary of the 5G NR radio frame.

In accordance with an embodiment, the communication device 102 may be further configured to measure a received signal strength (e.g., a received signal strength indicator (RSSI)) for each beam of the plurality of different beams of RF signals for each SSB location of the plurality of SSB locations in accordance with PSS timing. Alternatively stated, all the beams (i.e., the plurality of different beams of RF signals) are scanned for RSSI measurements.

In accordance with an embodiment, the communication device 102 may be further configured to sort the received plurality of different beams of RF signals that are received at the communication device 102 based on the measured received signal strength for each beam of the plurality of different beams. The received plurality of different beams of RF signals in terms of RSSI measurements. For example, from the beam having the highest RSSI, next highest RSSI beam, . . . , to beam having lowest RSSI. The communication device 102 may be further configured to switch to the beam of RF signals beams for the beam reception (Rx) that has a highest received signal strength of the received plurality of different beams of RF signals. Further, the communication device 102 may be further configured to concurrently activate communication of the beam of RF signals that has the highest received signal strength in the NR frequency band to the CPE 104A (or the UE 104B) for non-standalone access to the beam of RF signals in the NR frequency band at the CPE 104A (or the UE 104B).

In accordance with an embodiment, the communication device 102 may be further configured to decode the physical cell identity (PCI) of the beam of RF signals that has the highest received signal strength and a set of other beams of RF signals that has the received signal strength greater than a threshold signal strength value. For example, PCI for a defined number of sorted beams (e.g., first "M" number of beams that has high RSSI measurements) that has suitable RSSI, may be decoded. The communication device 102 may be further configured to store the decoded PCIs of the beam of RF signals that has the highest received signal strength and the set of other beams of RF signals that has the received signal strength greater than the threshold signal strength value.

In accordance with an embodiment, the communication device 102 may be further configured to acquire a PCI of a NR-enabled base station (e.g., the second base station 108 or gNB) and additional carrier information from the CPE 104A (or the UE 104B) based on the communication of the beam of RF signals in the NR frequency band. The PCI of the NR-enabled base station (e.g., the second base station 108 or gNB) and the additional carrier information may be acquired over the short-range wireless communication link 116 established previously with the CPE 104A (or the UE 104B). The retrieval of the PCI of the NR-enabled base station and additional carrier information from the CPE 104A (or the UE 104B) may be indicative of an assignment of the NR carrier frequency to the CPE 104A (or the UE 104B).

In accordance with an embodiment, the communication device 102 may be further configured to compare the PCI of the NR-enabled base station (e.g., gNB) acquired from the CPE 104A (or the UE 104B) with the stored PCIs at the communication device 102. In a case where the acquired PCI of the NR-enabled base station (e.g., gNB) is same as the decoded PCI associated with the beam of RF signals that has the highest received signal strength, the communication device 102 may be further configured to validate (i.e., confirm) the beam acquisition at the CPE 104A (or the UE 104B) for the non-standalone access to the beam of RF signals in the NR frequency as successful. The successful beam acquisition at the CPE 104A (or the UE 104B) may denote initial access of the CPE 104A (or the UE 104B) to the non-standalone 5G NR network, such as the 5G NR network 114. The initial access between the 5G-ready or 5G-capable device, for example, the CPE 104A (or the UE 104B) and the 5G-NR base station (e.g., the second base station 108) helps to initially connect to 5G NR network 114 and to perform synchronization with the 5G-NR network 114 very quickly and reliably as compared to conventional systems and methods.

In accordance with an embodiment, the communication device 102 may be further configured to initiate an uplink communication by application of beam reciprocity to the communicated beam of RF signals in the NR frequency band. The communication device 102 may be further configured to acquire Time Division Duplex (TDD) configuration information from the CPE 104A (or the UE 104B) over the established short-range wireless communication link 116, and accordingly start TDD switching in the NR frequency in the 5G NR network 114.

Figure 2:
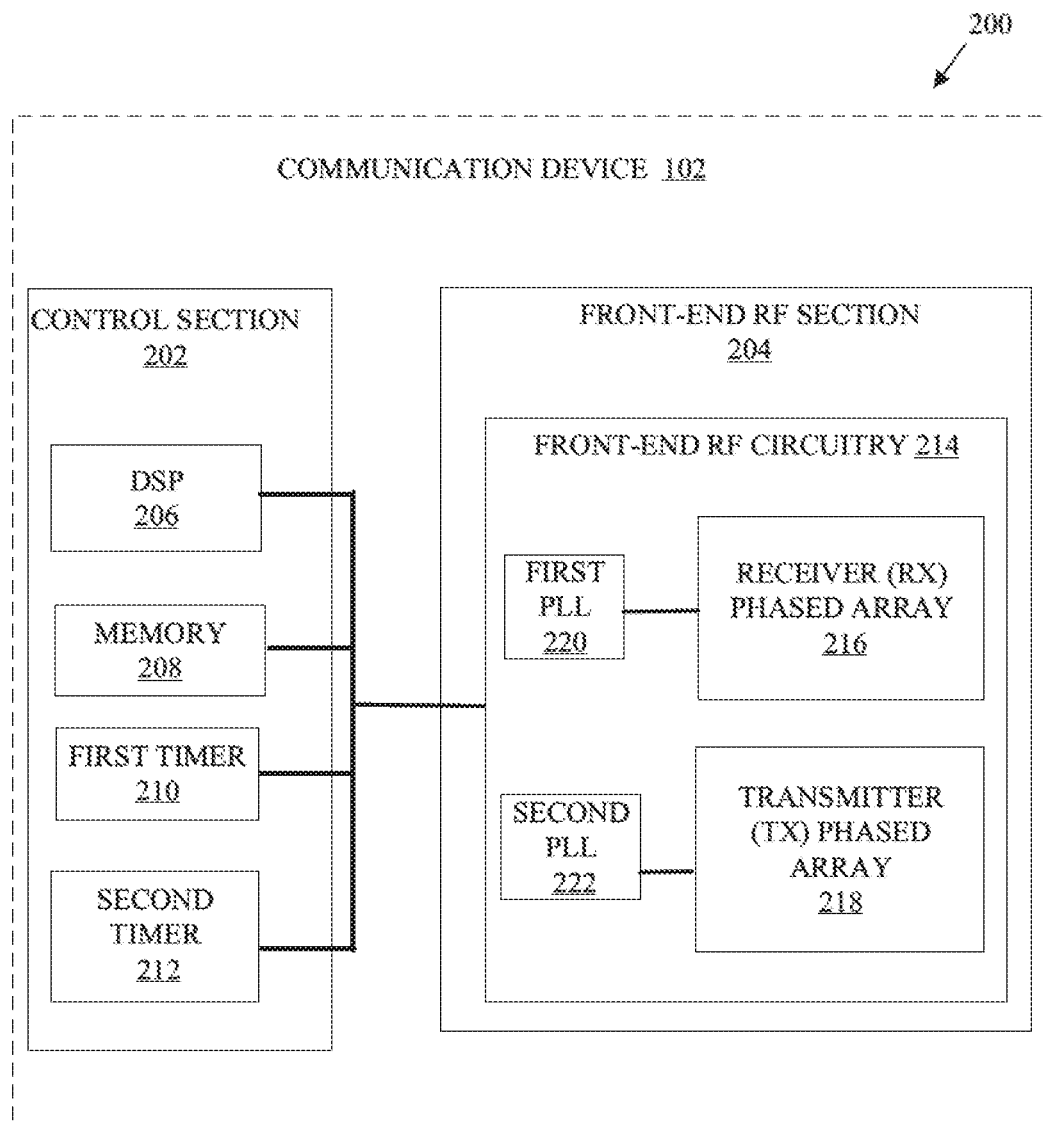
FIG. 2 is a block diagram illustrating various components of an exemplary communication device for low-latency initial access to NSA 5G NR network, in accordance with an exemplary embodiment of the disclosure.
Figure 3:
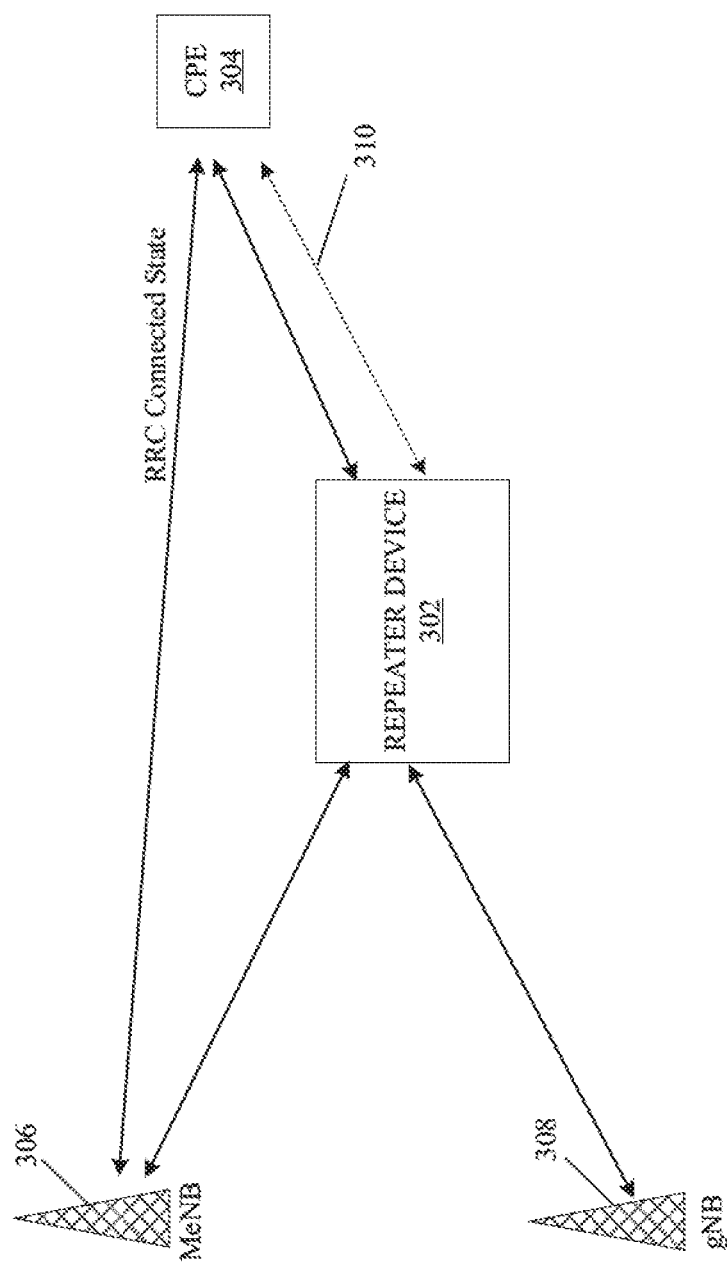
FIG. 3 illustrates an exemplary scenario for implementation of the communication device of FIG. 2 as a repeater equipment for low-latency initial access to NSA 5G NR network, in accordance with an embodiment of the disclosure.
Figure 4A:
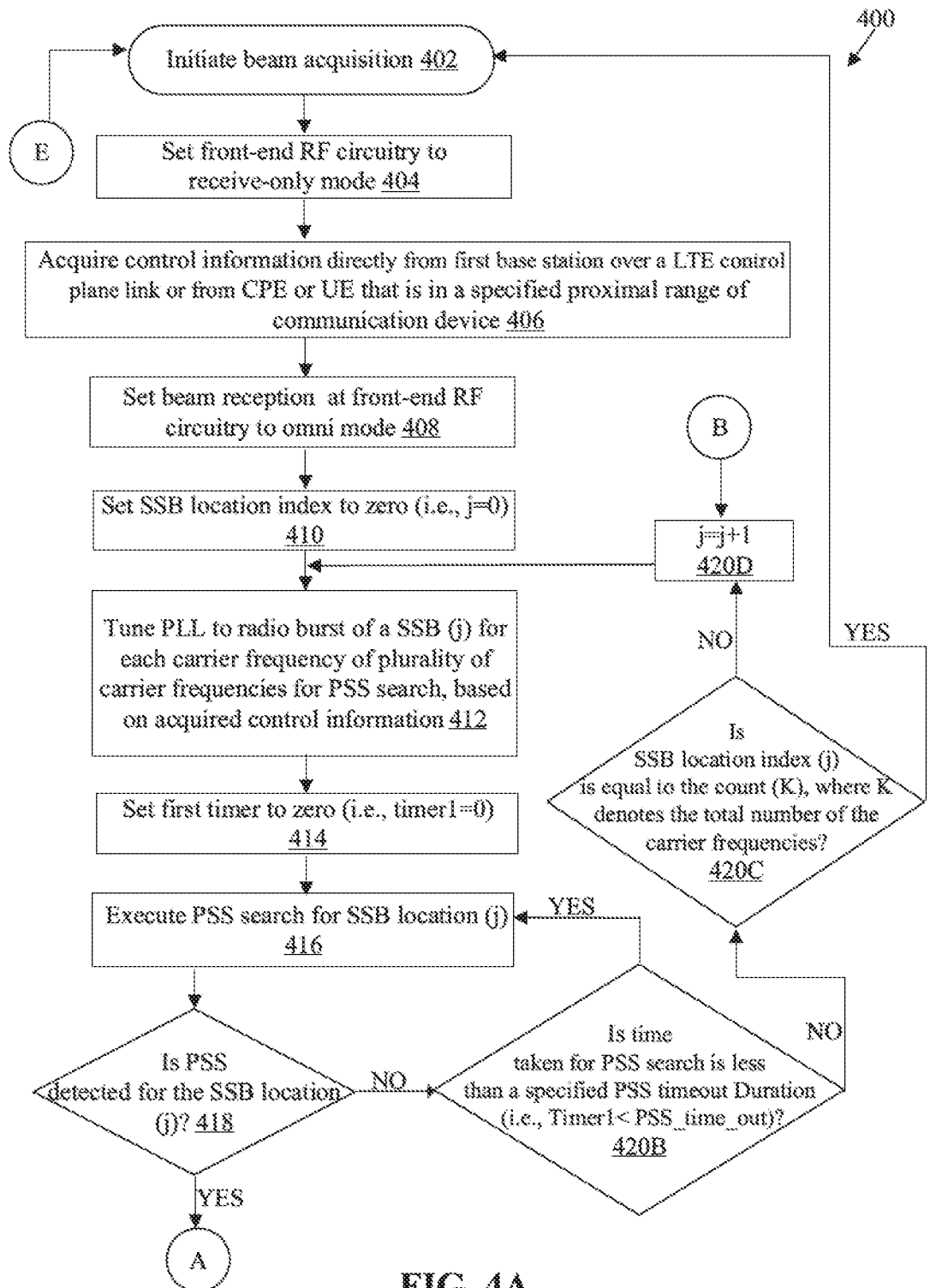
FIGS. 4A, 4B, 4C, and 4D collectively, depict a flow chart that illustrates an exemplary method for low-latency initial access to NSA 5G NR network, in accordance with an embodiment of the disclosure.
Figure 4B:
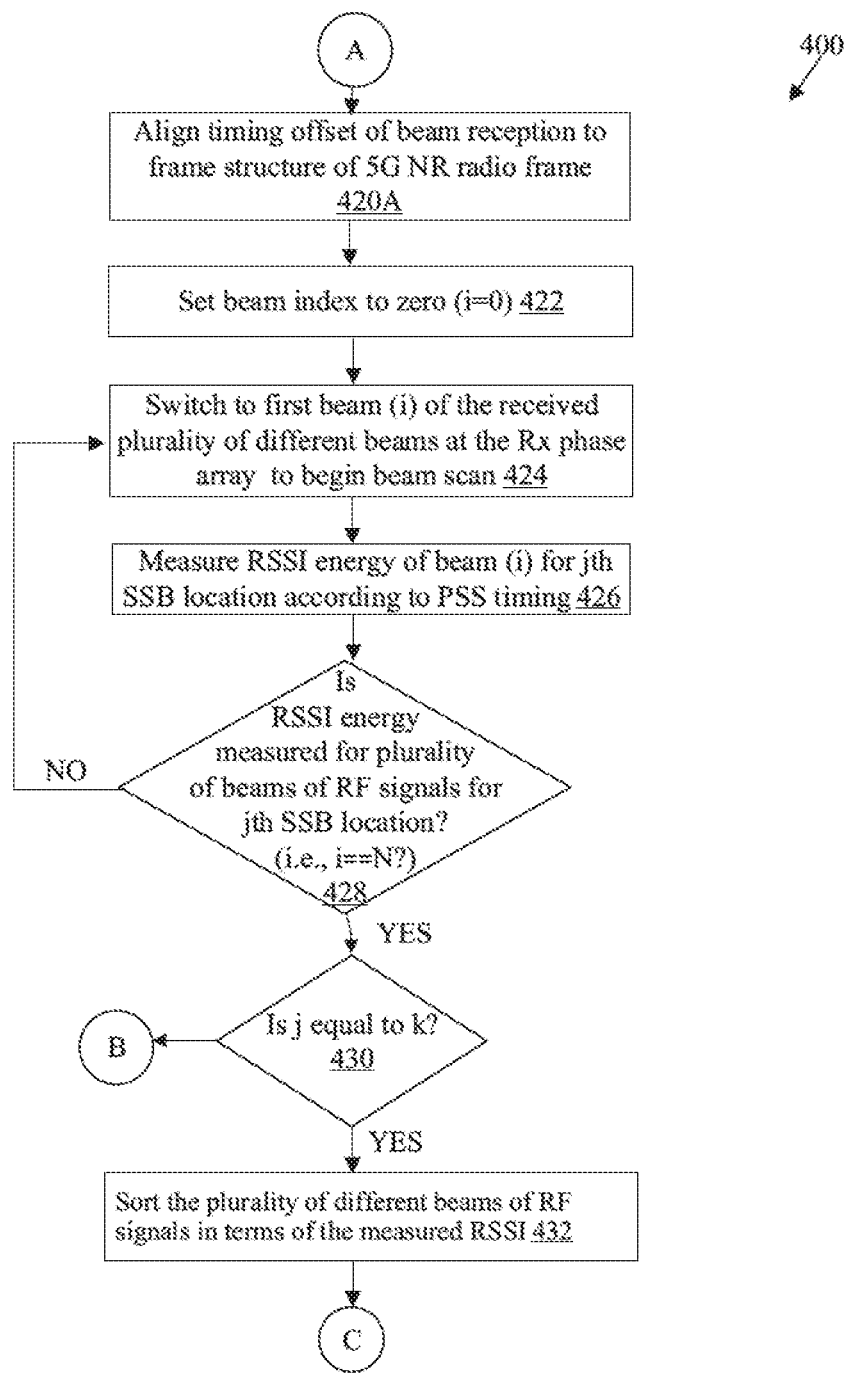
Figure 4C:
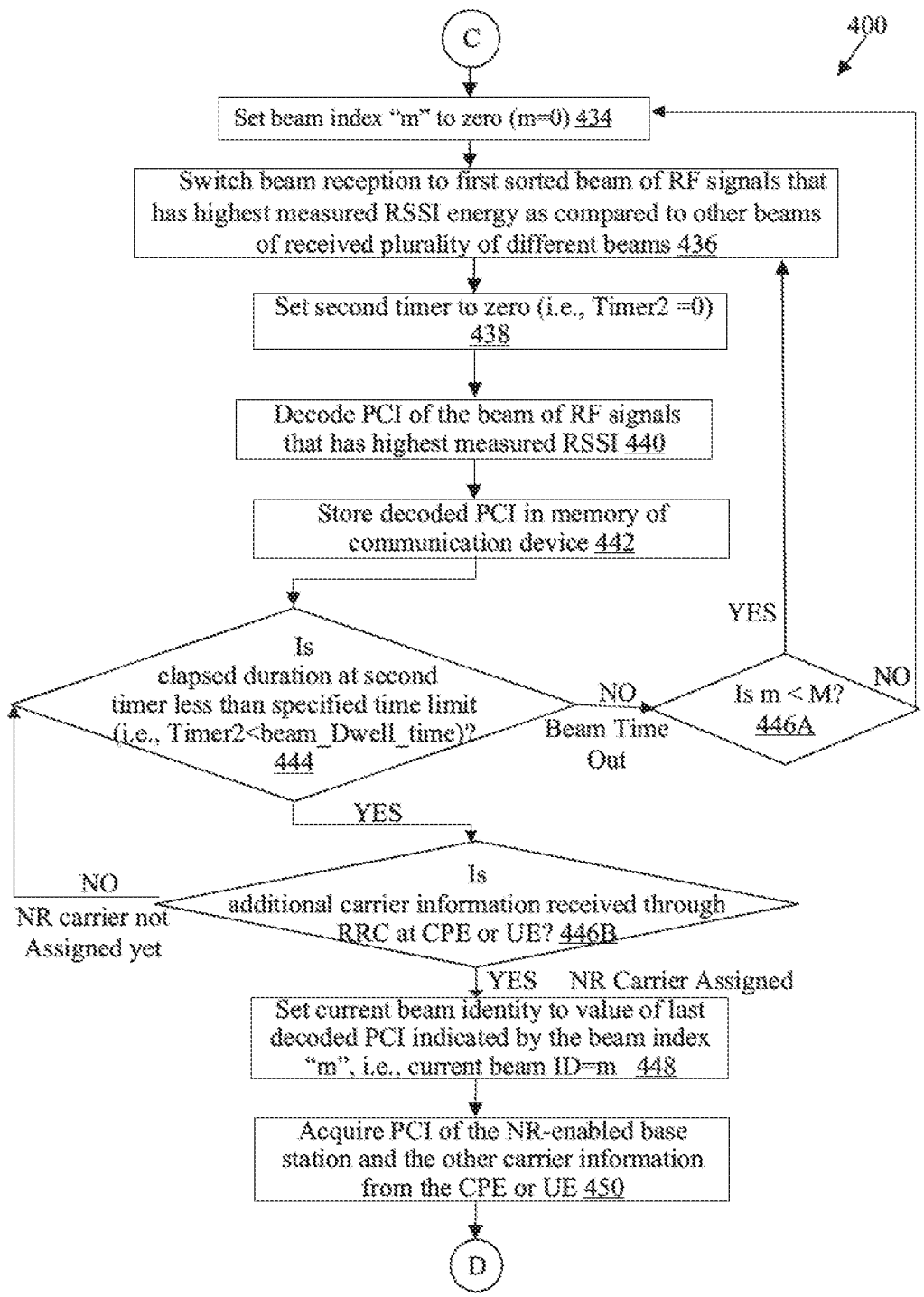
Figure 4D:
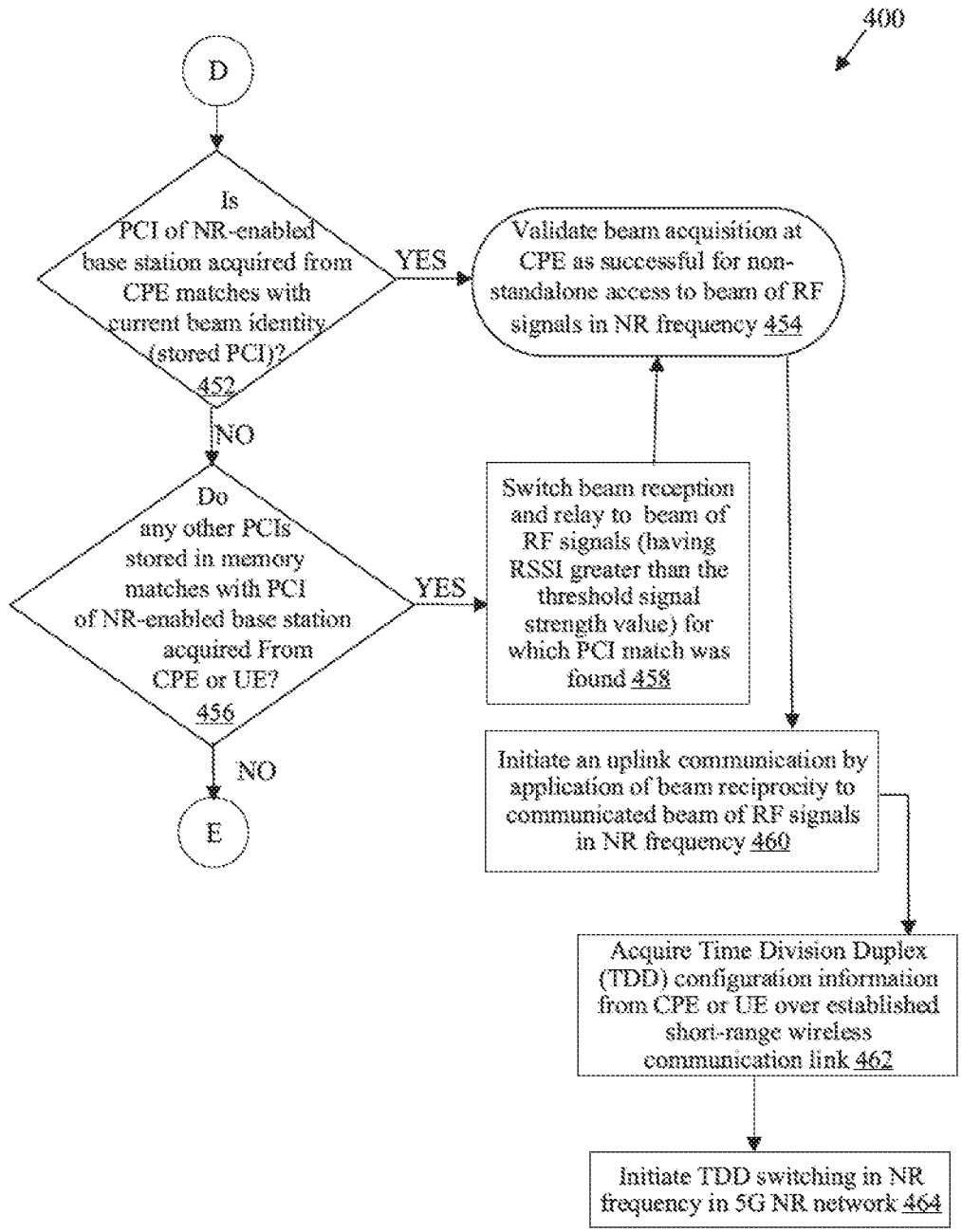

FIG. 2 is a block diagram illustrating various components of an exemplary communication device for low-latency initial access to NSA 5G NR network, in accordance with an exemplary embodiment of the disclosure. FIG. 2 is explained in conjunction with elements from FIG. 1. With reference to FIG. 3, there is shown a block diagram 200 of the communication device 102. The communication device 102 may include a control section 202 and a front-end radio frequency (RF) section 204. The control section 202 may control the initial access to the 5G NR network 114 in NSA mode. The control section 202 may include a digital signal processor (DSP) 206, a memory 208, a first timer 210, and a second timer 212. The control section 202 may be communicatively coupled to the front-end RF section 204. The front-end RF section 204 may include front-end RF circuitry 214. The front-end RF circuitry 214 may further include a front-end receiver circuit, such as a receiver (Rx) phased array 216, and a front-end transmitter circuit, such as a transmitter (Tx) phased array 218. The front-end RF circuitry 214 may further include a first PLL 220 communicatively coupled to the receiver (Rx) phased array 216. Similarly, a second PLL 222 may be communicatively coupled to the Tx phased array 218.

The DSP 206 may be configured to control the front-end RF circuitry 214. The DSP 206 may be configured to activate or deactivate a receive-only mode at the communication device 102. The DSP 206 may be configured to initiate beam acquisition, by use of the front-end RF circuitry 214, in the receive-only mode, where in the receive-only mode, a further communication (or a further relay when the communication device 102 is a relay node) of input RF signals is deactivated. For example, the front-end transmitter circuit, such as the Tx phased array 218 may be switched OFF in the receive-only mode while the front-end receiver circuit, such as the Rx phased array 216 is ON. The communication device 102 may be a programmable device, where the DSP 206 may execute instructions stored in the memory 208. Example of the implementation of the DSP 206 may include, but are not limited to an embedded processor, a microcontroller, a specialized DSP, a Reduced Instruction Set Computing (RISC) processor, an Application-Specific Integrated Circuit (ASIC) processor, a Complex Instruction Set Computing (CISC) processor, and/or other processors.

The memory 208 may include suitable logic, circuitry, and/or interfaces that may be configured to store instructions executable by the DSP 206. The memory 208 may be further configured to store decoded physical cell identities (PCIs) of one or more beams that has the highest received signal strength or received signal strength greater than the threshold signal strength value. Examples of implementation of the memory 208 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The first timer 210 and the second timer 212 may be configured to maintain a clock to schedule specified tasks, time specified events, or count specified events. For example, during PSS search for each SSB location at the communication device 102, a PSS time out duration may be specified for one SSB location at the first timer 210. In a case where PSS is not detected for an SSB location, the DSP 206 may be configured to determine whether the current time taken for PSS search is less than the specified PSS timeout duration. In a case where, the time taken for PSS search is less than the specified PSS timeout duration for a currently searched SSB location, the DSP 206 continues to search for the PSS, or else moves to a PSS search for the next SSB location (i.e., for next SSB frequency or next carrier frequency). Similarly, the second timer 212 may be utilized to manage time to decode PCI associated with the plurality of beams of RF signals received at the communication device 102. It is to be understood by a person having ordinary skill in the art that the control section 202 may further include one or more other components, such as analog to digital converters (ADCs), a 5G NR digital modem circuitry, digital to analog circuitry (DAC), a LTE modem, and the like, known in the art, which are omitted for brevity.

The front-end RF circuitry 214 may include the Rx phased array 216 and the Tx phased array 218. The Rx phased array 216 may be configured to receive a plurality of different beams of RF signals (omnidirectional beams) from a plurality of different directions in an omni mode. The DSP 206 may be configured to control radio signals reception by setting the omni mode at the Rx phased array 216. In accordance with an embodiment, the Rx phased array 216 may include a cascading receiver chain comprising various components (e.g., an antenna array, a set of low noise amplifiers (LNA), a set of receiver front end phase shifters, and a set of power combiners) for the beam reception (not shown for brevity). Similarly, the TX phased array 218 may include a cascading transmitter chain comprising various components, such as a set of power dividers, a set of transmitter front end phase shifters, a set of power amplifiers (PA), and antenna array for beam transmission (not shown for brevity). In accordance with an embodiment, the Rx phased array 216 and the Tx phased array 218 may receive one or more beams of input RF signals and transmit the one or more beams of output RF signals in accordance with multiple-input multiple-output (MIMO) reception and transmission.

The first PLL 220 may be tuned, by the DSP 206, to radio burst of an SSB for each carrier frequency of a plurality of carrier frequencies for the PSS search. The tuning of the first PLL 220 may be done based on the received control information that indicates a set of potential carriers accessible at the CPE 104A (or the UE 104B). In some embodiments, the tuning of the first PLL 220 may synchronize down conversion of received RF signals to the radio burst of SSB for each carrier frequency. The second PLL 222 may be a local oscillator similar to that of the first PLL 220 and may be associated with the Tx phased array 218 to facilitate up conversion of input baseband signals before transmission.

FIG. 3 illustrates an exemplary scenario for implementation of the communication device of FIG. 2 as a repeater equipment for low-latency initial access to NSA 5G NR network, in accordance with an embodiment of the disclosure. FIG. 3 is explained in conjunction with elements from FIGS. 1 and 2. With reference to FIG. 3, there is shown an exemplary NSA 5G NR network architecture which comprises a repeater device 302, a CPE 304, an MeNB 306, and a gNB 308. The repeater device 302, the CPE 304, the MeNB 306, and the gNB 308 may correspond to the communication device 102, the CPE 104A (or the UE 104B), the first base station 106, and the second base station 108 respectively (FIG. 1). There is further shown a short-range wireless communication link 310 between the repeater device 302 and the CPE 304. The short-range wireless communication link 310 may correspond to the short-range wireless communication link 116 of FIG. 1.

In the exemplary scenario, the repeater device 302 after installation at a defined fixed location (e.g. around a post or pillar), may be configured to cover a portion a 360-degree scan range or 360-degree scan range for communication among the MeNB 306, the gNB 308, and one or more remote CPEs, such as the CPE 304. In this exemplary scenario, the CPE 304 is shown. However, it is to be understood that a UE (such as the UE 104B) may be used instead of the CPE 304. The CPE 304 may be in a radio resource control (RRC) connected state over a LTE network (e.g. the LTE network 112) before an initial access is granted to the non-standalone 5G NR network (such as the 5G NR network 114 (FIG. 1) for a dedicated connection state with the gNB 308 for high-speed data access.

In accordance with an embodiment, the DSP 206 may be further configured to initiate beam acquisition that denotes a start of initial access procedure. The beam acquisition may be initiated in a receive-only mode (i.e., downlink-only mode), in which a further communication of input RF signals received at the repeater device 302 is deactivated. The DSP 206 may be further configured to establish the short-range wireless communication link 310 with the CPE 304 that is in a specified proximal range of the repeater device 302. The DSP 206 may be further configured to acquire control information (e.g., carrier information) from the CPE 304 over the established short-range wireless communication link 310. The DSP 206 may be further configured to control radio signals reception by setting beam reception at the repeater device 302 to an omni mode in which a plurality of different beams of RF signals are receivable at the repeater device 302 from omni directions.

Thus, there is no beamforming operations yet at the repeater device 302. Setting the beam reception at the repeater device 302 to the omni mode accelerates initial primary signal synchronization (PSS) search. The PSS that forms a first part of the SSB require only low signal to noise ratio (SNR) for PSS detection, thereby unwanted delay is avoided that could have been caused if any beamforming operations were done at this stage. Further, time taken to begin PSS search is significantly reduced as compared to conventional systems and methods of initial access.

In accordance with an embodiment, the DSP 206 may be further configured to execute a primary signal synchronization (PSS) search from each SSB location of a plurality of SSB locations based on the acquired control information. The control information includes the plurality of SSB locations shared by the CPE 304. Alternatively stated, a set of potential carriers in the LTE network is shared by the CPE 302 to the repeater device 302 via the established short-range wireless communication link 310. In some embodiments, the set of potential carriers may also include one carrier or multiple 5G NR carriers. The CPE 304 searches for SSBs for the carrier information. Each SSB location indicates a carrier frequency offset.

In accordance with an embodiment, the DSP 206 may be further configured to tune the first PLL 220 to radio burst of SSB at each SSB location (i.e., each carrier frequency) of a plurality of carrier frequencies (i.e., SSB frequencies) for the PSS search, based on the received control information. The DSP 206 instructs the radio signal reception to tune to the carrier frequency offset. The gNB 308 (i.e. 5G NR-enabled base station) may periodically transmit SSBs carrying synchronization signals (e.g. PSS, secondary synchronization signal (SSS)) and broadcast channels (PBCH) by use of beam sweeping. One SS block may include 1 symbol PSS, 1 symbol SS and 2 symbols PBCH. SS burst (or the radio burst) may carry one or multiple SSBs. Typically, a combination of PSS and SSS helps to identify about 1008 PCI for a geographical area.

Thereafter, the DSP 206 may be further configured to execute the PSS search from each SSB location of the plurality of SSB locations based on the acquired control information. The DSP 206 may be further configured to detect a PSS for at least one SSB location based on the executed PSS search. The DSP 206 may be further configured to align a timing offset of the beam reception to a frame structure of a 5G NR radio frame based on the detected PSS for the at least one SSB location (e.g., a 5G NR carrier frequency). The detected PSS indicates a timing boundary of the 5G NR radio frame, and thus having the detected PSS can also align a 5G-ready device, such as the repeater device 302 for relay or its timing boundary with the frame structure of the 5G NR radio frame. The DSP 206 may be further configured to measure RSSI for each beam of the plurality of different beams of RF signals for each SSB location of the plurality of SSB locations in accordance with PSS timing after the PSS is detected.

In accordance with an embodiment, the DSP 206 may be further configured to switch to a specific beam of RF signals in the 5G NR frequency that has a highest RSSI of the received plurality of different beams for the beam reception. Concurrently, the same beam of RF signals that is switched to at the Rx phased array 216 for reception is further transmitted to the CPE 304. The receive-only mode is deactivated, and further communication of the specific beam of RF signals in the 5G NR frequency is activated. Thereafter, the DSP 206 may be further configured to acquire the PCI of a NR-enabled base station, such as the gNB 308, and additional carrier information from the CPE 304 over the established short-range wireless communication link 310. The DSP 206 may be further configured to validate and confirm the beam acquisition at the CPE 304 for the non-standalone access to the beam of RF signals in the NR frequency as successful. The confirmation may be done based on a match of the PCI of the NR-enabled base station, such as the gNB 308, acquired from the CPE 304 with the PCI associated with the specific beam of RF signals that has the highest RSSI. The confirmation indicates success of the initial access of the CPE 304 to 5G NR network in NSA mode. The CPE 304 may be concurrently connected to the MeNB 306 and the gNB 308 in the non-standalone (NSA) 5G NR mode for the enhanced data-rates. Alternatively stated, in the NSA, the radio connection is anchored in LTE network while 5G NR carriers are used to boost data-rates.

FIGS. 4A, 4B, 4C, and 4D collectively, depict a flow chart that illustrates an exemplary method for low-latency initial access to NSA 5G NR network, in accordance with an embodiment of the disclosure. With reference to FIGS. 4A, 4B, 4C, and 4D there is shown a flow chart 400 The flow chart 400 is described in conjunction with FIGS. 1, 2, and 3. Referring to FIGS. 4A, 4B, 4C, and 4D there is shown a flow chart 400 comprising exemplary operations 402 through 464.

At 402, the beam acquisition may be initiated at the communication device 102. At 404, the front-end RF circuitry 214 may be set to the receive-only mode. The Tx phased array 218 may be deactivated and thus a further communication of input RF signals may be deactivated.

At 406, control information may be acquired either directly from the first base station 106 over an LTE control plane link or from the CPE 104A (or a UE) that may be in a specified proximal range of the communication device 102. The CPE 104A (or the UE 104B) may be in a radio resource control (RRC) connected state over the LTE network 112. Here, a variable K is set to a count that is equal to a set of potential carrier frequencies as indicated in the control information. In accordance with an embodiment, the short-range wireless communication link 116 may be established with the CPE 104A (or the UE 104B) and the control information may be acquired over the short-range wireless communication link 116 (e.g., Bluetooth, Wi-Fi, Li-Fi, and the like).

At 408, beam reception at the the front-end RF circuitry 214, such as at the Rx phased array 216, may be set to an omni mode in which a plurality of different beams of RF signals are receivable from omni directions. There may be no beamforming operations yet at the communication device 102. Setting the beam reception at the communication device 102 to the omni mode accelerates initial primary signal synchronization (PSS) search. The PSS that forms a first part of the SSB require only low signal to noise ratio (SNR) for PSS detection, thereby unwanted delay is avoided that could have been caused if any beamforming operations were done at this stage. Further, time taken to begin PSS search is significantly reduced as compared to conventional systems and methods of initial access.

At 410, an SSB location index is set to zero (i.e., j=0). Here, j is SSB location index in a search list of SSB locations. At 412, a PLL (e.g., the first PLL 220) may be tuned to radio burst of an SSB (j) for each carrier frequency of a plurality of carrier frequencies for the PSS search, based on the received control information. The plurality of carrier frequencies may also be referred to as a plurality of SSB frequencies acquired from the CPE 304.

At 414, the first timer 210 may be set to zero (i.e., first timer=0). At 416, a PSS search is executed for an SSB location (j). At 418, it may be determined whether a PSS is detected or not for the SSB location (j). In a case where the PSS is detected for the SSB location (j), the control moves to 420A, else to 420B. At 420B, in the case where the PSS is not detected for the SSB location (j), it may be determined whether the current time taken for PSS search is less than a specified PSS timeout duration (Is first timer set at 0<specified PSS timeout duration (i.e., Timer1<PSS_time_out). In a case where, the time taken for PSS search is less than the specified PSS timeout duration for a currently searched SSB location (j), the control returns to 416 (i.e., the DSP 206 continues to search for PSS for SSB location (j)) or else the control moves to 420C.

At 420C, it may be determined whether the current SSB location index (j) is equal to the count (K), where K denotes the total number of the carrier frequencies in the set of potential carrier frequencies (or SSB frequencies) as indicated in the control information. In cases where j not equal to k, control moves to 420D, else the control returns to 402 (which indicates that PSS is not detected for any SSB location). At 420D, the SSB location index (j) is increased by 1 (i.e., j=j+1), which indicates the control returns to 412 for next carrier frequency (i.e., next SSB frequency).

At 420A, in the case where the PSS is detected for an SSB location, a timing offset of the beam reception is aligned to a frame structure of a 5G NR radio frame based on the detected PSS for the SSB location. The detected PSS indicates a timing boundary of the 5G NR radio frame. At 422, i=0, that is a beam index is set to zero numeric value.

At 424, a first beam (i) of the received plurality of different beams is switched at the Rx phase array 216 to begin beam scan. At 426, RSSI energy of beam (i) for jth SSB location may be measured according to PSS timing. This RSSI energy may be stored as P(i,j). Alternatively stated, a received signal strength may be measured for each beam of the plurality of different beams of RF signals for each SSB location of the plurality of SSB locations in accordance with the PSS timing of the detected PSS.

At 428, it may be determined whether RSSI energy is measured for all the plurality of beams of RF signals for jth SSB location (i.e., "i" is not equal to N, where N is a count of beams of the plurality of beams of RF signals). The RSSI is a measure of power present in a received RF signal. The RSSI may provide useful information such as rough estimate of distance between transmitters of the RF signal from the communication device 102. In a case where, RSSI energy is not measured for all the plurality of beams of RF signals for jth SSB location, the control returns to 424, else the control moves to 430.

At 430, it may be further determined whether the current SSB location index (jth SSB location) is equal to the count (K), where K denotes the total number of the carrier frequencies in the set of potential carrier frequencies (or SSB frequencies) as indicated in the control information (i.e., Is j==k?). In cases where j not equal to k, the control moves to 420D, else the control moves to 432. At 432, the received plurality of different beams of RF signals that are received at the communication device 102 are sorted based on the measured RSSI energy for the plurality of different beams for different SSB locations. Alternative stated, the plurality of different beams of RF signals are sorted in terms of the measured RSSI (e.g., P(0)>P(1)> . . . >P(N*K)).

At 434, a beam index "m" is set to zero (0). At 436, beam reception is switched to the first sorted beam of RF signals that has a highest measured RSSI energy as compared to other beams of the received plurality of different beams. Further, communication of the first sorted beam of RF signals in a new radio (NR) frequency that has the highest measured RSSI energy is activated to the CPE 104A (or the UE 104B).

At 438, the second timer 212 is set to zero (i.e., Timer2=0). At 440, the PCI of the beam of RF signals that has the highest measured RSSI is decoded. At 442, the decoded PCI may be stored in the memory 208 of the communication device 102. At 444, it may be determined whether an elapsed duration at the second timer 212 is less than a specified time limit (e.g., a beam dwell time), (i.e., if Timer2<beam_dwell_time). In cases where the elapsed duration at the second timer 212 is less than the specified time limit, the control passes to 446B, else to 446A.

At 446A, it may be determined whether the count of stored decoded PCI(s) indicated by the beam index "m" is less than a threshold value, i.e., "M" (i.e., if m<M). The threshold value sets a limit so that only a specified number of beams of RF signals above the threshold RSSI are processed for decoding of PCIs. For example, first 2-X beams having RSSI above threshold range may be processed. In a case where, m is less than M, the control returns to 434, or else to 402. At 446B, it may be determined whether additional carrier information through RRC is received at the CPE 104A (or the UE 104B). As the first sorted beam of RF signals in the NR frequency that has the highest measured RSSI energy is communicated to the CPE 104A (or the UE 104B), it is expected additional carrier information for the last communicated beam in NR frequency is likely to be available at the CPE 104A (or the UE 104B). In cases where the additional carrier information through RRC is received at the CPE 104A (or the UE 104B), it is an indication that the NR frequency is assigned at the CPE 104A (or the UE 104B) and the control passes to 446, or else the control returns to 442 as the NR frequency may not be assigned yet.

At 448, the current beam identity is set to the value of the last decoded PCI indicated by the beam index "m", i.e., current beam ID=m. At 450, the PCI of the NR-enabled base station (e.g., the gNB 308) and the other carrier information may be acquired from the CPE 104A (or the UE 104B). The PCI of the NR-enabled base station (e.g., the gNB 308) and other carrier information may be acquired over the established short-range wireless communication link.

At 452, the PCI of the NR-enabled base station (e.g., the gNB 308) acquired from the CPE 104A (or the UE 104B) may be compared with the current beam identity (i.e., the stored PCI in the memory 208 for the last decoded beam. In a case where the PCI of the NR-enabled base station (e.g., the gNB 308) acquired from the CPE 104A (or the UE 104B) matches the current beam identity, the control passes to 454, or else to 456. At 454, the beam acquisition at the CPE 104A (or the UE 104B) for the non-standalone access to the beam of RF signals in the NR frequency is validated as successful. The successful beam acquisition indicates success of the initial access of the CPE 104A (or the UE 104B) to 5G NR network in the NSA mode for EN-DC.

At 456, it may be determined whether any other PCIs stored in the memory 208 matches with the PCI of the NR-enabled base station (e.g., the gNB 308) acquired from the CPE 104A (or the UE 104B). In a case where a match is found, the control passes to 458, or else returns to 402. At 458, beam reception and communication (or relay) may be switched to that beam of RF signals (having RSSI greater than the threshold signal strength value) for which the PCI match was found (e.g., at 456). The control passes to 454.

At 460, an uplink communication may be initiated by application of beam reciprocity to the communicated beam of RF signals in the NR frequency. At 462, Time Division Duplex (TDD) configuration information may be acquired from the CPE 104A (or the UE 104B) over the established short-range wireless communication link. At 464, TDD switching may be initiated in the NR frequency in the 5G NR network 114.

Various embodiments of the disclosure may provide a non-transitory computer-readable medium having stored thereon, computer implemented instructions that when executed by one or more circuits causes a device to execute operations to initiate beam acquisition in a receive-only mode, where in the receive-only mode, a further communication of input RF signals is deactivated. Control information may be acquired from a CPE (e.g., the CPE 104A (or the UE 104B)) that is in a specified proximal range of the communication device 102. The CPE may be in a RRC connected state over a LTE network. Beam reception at the front-end RF circuitry 214 may be set to an omni mode in which a plurality of different beams of RF signals are receivable at the communication device 102 from a plurality of different directions. A PSS search may be executed from each SSB location of a plurality of SSB locations based on the acquired control information. The PSS may be detected for at least one SSB location based on the executed PSS search. A received signal strength may be measured for each beam of the plurality of different beams of RF signals for each SSB location of the plurality of SSB locations in accordance with a PSS timing of the detected PSS. Beam reception may be switched to a beam of RF signals that has the highest received signal strength of the received plurality of different beams. The beam of RF signals that has the highest received signal strength in the NR frequency may be communicated to the CPE 104A (or the UE 104B) for non-standalone access to the beam of RF signals in the NR frequency band at the CPE 104A (or the UE 104B).

Various embodiments of the disclosure may provide a system for low-latency initial access to non-standalone 5G NR network. The system may include the communication device 102 (FIG. 1) that comprises the front-end RF circuitry 214 (FIG. 2) and the DSP 206 (FIG. 2) that may be communicatively coupled to the front-end RF circuitry 214. The DSP 206 may be configured to initiate beam acquisition, by use of the front-end RF circuitry 214, in a receive-only mode, where in the receive-only mode, a further communication of input RF signals is deactivated. The DSP 206 may be further configured to acquire control information either directly from the first base station 106 over an LTE control plane link or from the CPE 104A (or the UE 104B) (FIG. 1) that is in a specified proximal range of the communication device 102, where the CPE is in an RRC connected state over the LTE network 112. The DSP 206 may be further configured to set beam reception at the front-end RF circuitry 214 to an omni mode in which a plurality of different beams of RF signals are receivable at the communication device from a plurality of different directions. The DSP 206 may be further configured to execute a PSS search from each SSB location of a plurality of SSB locations based on the acquired control information. The DSP 206 may be further configured to detect the PSS for at least one SSB location based on the executed PSS search. The DSP 206 may be further configured to measure a received signal strength for each beam of the plurality of different beams of RF signals for each SSB location of the plurality of SSB locations in accordance with a PSS timing of the detected PSS. The DSP 206 may be further configured to switch to a beam of RF signals that has the highest received signal strength of the received plurality of different beams for the beam reception. Further, the DSP 206 may be further configured to activate communication of the beam of RF signals that has the highest received signal strength in a NR frequency to the CPE 104A (or the UE 104B) or the UE 104B for non-standalone access to the beam of RF signals in the NR frequency band at the CPE 104A (or the UE 104B) or the UE 104B.

In accordance with an embodiment, the communication device 102 may be at least one of an evolved-universal terrestrial radio access-NR dual connectivity (EN-DC) device, a NR-enabled relay node, or a NR-enabled repeater device. The CPE 104A or the UE 104B may be an EN-DC device. The DSP 206 may be further configured to establish a short-range wireless communication link with the CPE 104A (or the UE 104B) or the UE 104B that is in the specified proximal range of the communication device 102, where the control information from the CPE 104A (or the UE 104B) or the UE 104B may be acquired based on the established short-range wireless communication link. The control information may include information of one or more SSBs. The control information indicates a set of potential carrier frequencies shared via the LTE network.

In accordance with an embodiment, the communication device 102 may include a PLL circuit (such as the first PLL 220). The DSP 206 may be further configured to tune the PLL to radio burst of a SSB for each carrier frequency of a plurality of carrier frequencies for the PSS search, based on the received control information. The plurality of carrier frequencies may also be referred to as a plurality of SSB frequencies. The DSP 206 may be further configured to align a timing offset of the beam reception to a frame structure of a 5G NR radio frame based on the detected PSS for the at least one SSB location. The detected PSS indicates a timing boundary of the 5G NR radio frame.

The DSP 206 may be further configured to sort the received plurality of different beams of RF signals that are received at the communication device 102 based on the measured received signal strength for each beam of the plurality of different beams. The measured received signal strength may be a received signal strength indicator (RSSI) energy measurement. The DSP 206 may be further configured to decode the PCI of the beam of RF signals that has the highest received signal strength and a set of other beams of RF signals that has the received signal strength greater than a threshold signal strength value. The communication device 102 may comprise the memory 208. The DSP 206 may be further configured to store, in the memory 208, the decoded PCIs of the beam of RF signals that has the highest received signal strength and the set of other beams of RF signals that has the received signal strength greater than the threshold signal strength value.

In accordance with an embodiment, the DSP 206 may be further configured to acquire a PCI of the NR-enabled base station (e.g., the second base station 108 or the gNB 308) and additional carrier information from the CPE 104A (or the UE 104B) based on the communication of the beam of RF signals in the NR frequency band. The PCI of the NR-enabled base station and carrier information is acquired over the short-range wireless communication link established with the CPE 104A (or the UE 104B). The retrieval of the PCI of the NR-enabled base station and additional carrier information from the CPE indicates an assignment of the NR carrier frequency to the CPE 104A (or the UE 104B).

In accordance with an embodiment, the DSP 206 may be further configured to compare the PCI of the NR-enabled base station acquired from the CPE 104A (or the UE 104B) with the stored PCIs in the memory 208. The DSP 206 may be further configured to validate the beam acquisition at the CPE 104A (or the UE 104B) for the non-standalone access to the beam of RF signals in the NR frequency as successful based on a match of the acquired PCI of the NR-enabled base station and the PCI associated with the beam of RF signals that has the highest received signal strength. The DSP 206 may be further configured to initiate an uplink communication (e.g., from the CPE 104A or the UE 104B) to the second base station 108) by application of beam reciprocity to the communicated beam of RF signals in the NR frequency.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A communication device, comprising:
   a front-end radio frequency (RF) circuitry;
   a digital signal processor communicatively coupled to the front-end RF circuitry, wherein the digital signal processor is configured to:
   initiate beam acquisition, by use of the front-end RF circuitry, in a receive-only mode;
   acquire control information from at least one of a user equipment (UE) or a customer premise equipment (CPE) that is in a specified proximal range of the communication device, or directly from a first base station over a long term evolution (LTE) control plane link, wherein the UE or the CPE is in a radio resource control (RRC) connected state over an LTE network;

set beam reception at the front-end RF circuitry to an omni-mode in which a plurality of different beams of RF signals are receivable at the communication device from a plurality of different directions;

execute a primary signal synchronization (PSS) search from each signal synchronization block (SSB) location of a plurality of SSB locations based on the acquired control information, wherein the PSS search is continued based on an absence of the PSS in a SSB location of the plurality of SSB locations and a comparison of a current time taken for the PSS search with a specified duration; and activate communication of the beam of RF signals in a new radio (NR) frequency band to the UE or the CPE.

2. The communication device of claim 1, wherein the communication device is at least one of an evolved-universal terrestrial radio access-NR dual connectivity (EN-DC) device, a NR-enabled relay node, or a NR-enabled repeater device, and wherein the UE or the CPE is an EN-DC device.

3. The communication device of claim 1, wherein in the receive-only mode, a further communication of input RF signals is deactivated.

4. The communication device of claim 1, wherein the digital signal processor is further configured to establish a short-range wireless communication link with the UE or the CPE that is in the specified proximal range of the communication device, wherein the control information from the UE or the CPE is acquired based on the established short-range wireless communication link.

5. The communication device of claim 1, wherein the control information comprises information of one or more signal synchronization blocks (SSBs), and wherein the control information indicates a set of potential carrier frequencies shared via the LTE network.

6. The communication device of claim 1, further comprising a phase-locked loop (PLL) circuit, wherein the digital signal processor is further configured to tune the PLL to radio burst of a signal synchronization block (SSB) for each carrier frequency of a plurality of carrier frequencies for the PSS search, based on the control information, wherein the plurality of carrier frequencies corresponds to a plurality of SSB frequencies.

7. The communication device of claim 6, wherein the digital signal processor is further configured to align a timing offset of the beam reception to a frame structure of a 5G NR radio frame based on the PSS for at least one SSB location, wherein the PSS indicates a timing boundary of the 5G NR radio frame.

8. The communication device of claim 1, wherein the digital signal processor is further configured to sort the plurality of different beams of RF signals that are received at the communication device based on a received signal strength for each beam of the plurality of different beams, wherein the received signal strength is a received signal strength indicator (RSSI) measurement.

9. The communication device of claim 1, wherein the digital signal processor is further configured to decode a physical cell identity (PCI) of the beam of RF signals that has a highest received signal strength and a set of other beams of RF signals that has a received signal strength greater than a threshold signal strength value.

10. The communication device of claim 9, further comprising a memory, wherein the digital signal processor is further configured to store, in the memory, the PCI of the beam of RF signals that has a highest received signal strength and the set of other beams of RF signals that has the received signal strength greater than the threshold signal strength value.

11. The communication device of claim 10, wherein the digital signal processor is further configured to acquire the PCI of a NR-enabled base station and additional carrier information from the UE or the CPE based on the communication of the beam of RF signals in the NR frequency band, wherein the PCI of the NR-enabled base station and carrier information is acquired over a short-range wireless communication link established with the UE or the CPE, and wherein the retrieval of the PCI of the NR-enabled base station and additional carrier information from the UE or the CPE indicates an assignment of the NR frequency band to the UE or the CPE.

12. The communication device of claim 11, wherein the digital signal processor is further configured to compare the PCI of the NR-enabled base station acquired from the UE or the CPE with the stored PCI in the memory.

13. The communication device of claim 12, wherein the digital signal processor is further configured to validate the beam acquisition at the UE or the CPE based on a match of the PCI of the NR-enabled base station and the PCI associated with the beam of RF signals that has the highest received signal strength.

14. The communication device of claim 13, wherein the digital signal processor is further configured to initiate an uplink communication by application of beam reciprocity to the communicated beam of RF signals in the NR frequency band from the UE or the CPE.

15. A method, comprising:

in a communication device that includes a digital signal processor:

initiating, by the digital signal processor, beam acquisition in a receive-only mode;

retrieving, by the digital signal processor, control information directly from a first base station over a long-term evolution (LTE) control plane link, or from at least one of a user equipment (UE) or a customer premise equipment (CPE) that is in a specified proximal range of the communication device, wherein the UE or the CPE is in a radio resource control (RRC) connected state over a LTE network;

setting, by the digital signal processor, beam reception at the communication device to an omni-mode in which a plurality of different beams of RF signals are receivable at the communication device from a plurality of different directions;

executing, by the digital signal processor, a primary signal synchronization (PSS) search from each signal synchronization block (SSB) location of a plurality of SSB locations based on the control information;

wherein the PSS search is continued based on an absence of the PSS in an SSB location of the plurality of SSB locations and a comparison of a current time taken for the PSS search with a specified duration; and activating, by the digital signal processor, communication of the beam of RF signals in a new radio (NR) frequency band to the UE or the CPE.

16. The method of claim 15, further comprising establishing, by the digital signal processor, a short-range wireless communication link with the UE or the CPE that is in the specified proximal range of the communication device, wherein the control information from the UE or the CPE is acquired based on the established short-range wireless communication link.

17. The method of claim 15, further comprising tuning a phase-locked loop (PLL) circuit of the communication device to radio burst of a signal synchronization block (SSB) for each carrier frequency of a plurality of carrier frequencies for the PSS search, based on the control information.

18. The method of claim 15, further comprising aligning, by the digital signal processor, a timing offset of the beam reception to a frame structure of a 5G NR radio frame based on the PSS for at least one SSB location, wherein the PSS indicates a timing boundary of the 5G NR radio frame.

19. The method of claim 15, further comprising validating, by the digital signal processor, the beam acquisition at the UE or the CPE based on a match of a physical cell identity (PCI) of a NR-enabled base station and the PCI associated with the beam of RF signals that has a highest received signal strength, wherein the PCI of the NR-enabled base station is acquired from the UE or the CPE over a short-range wireless communication link.

20. A method, comprising:
in a communication device that includes a digital signal processor:
initiating, by the digital signal processor, beam acquisition in a receive-only mode;
establishing, by the digital signal processor, a short-range wireless communication link with a user equipment (UE) or a customer premise equipment (CPE) that is in a specified proximal range of the communication device;
retrieving, by the digital signal processor, control information directly from a first base station over a long-term evolution (LTE) control plane link or from the UE or the CPE based on the established short-range wireless communication link, wherein the UE or the CPE is in a radio resource control (RRC) connected state over a LTE network;
setting, by the digital signal processor, beam reception at the communication device to an omni-mode in which a plurality of different beams of RF signals are receivable at the communication device from a plurality of different directions;
executing, by the digital signal processor, a primary signal synchronization (PSS) search from each signal synchronization block (SSB) location of a plurality of SSB locations based on the control information,
wherein the PSS search is continued based on an absence of the PSS in an SSB location of the plurality of SSB locations and a comparison of a current time taken for the PSS search with a specified duration;
activating, by the digital signal processor, reception of a beam of RF signals from a NR-enabled base station in a new radio (NR) frequency band and subsequent communication of the beam of RF signals in the NR frequency band to the UE or the CPE;
retrieving, by the digital signal processor, a physical cell identity (PCI) of a NR-enabled base station and additional carrier information from the UE or the CPE over the established short-range wireless communication link; and
validating, by the digital signal processor, the beam acquisition at the UE or the CPE based on a match of the PCI of the NR-enabled base station acquired from the UE or the CPE with the PCI associated with the beam of RF signals.

* * * * *